US006931439B1

(12) United States Patent
Hanmann et al.

(10) Patent No.: US 6,931,439 B1
(45) Date of Patent: Aug. 16, 2005

(54) MODIFYING WEB PAGE LINKS FOR DISPLAY ON A MOBILE TERMINAL TO INDICATE THE CACHE STATUS OF LINKED WEB PAGES

(75) Inventors: Jonathan Lee Hanmann, Corona, CA (US); Anil Sareen, Mission Viejo, CA (US); Kenneth J. Smith, Corona, CA (US)

(73) Assignee: Western Digital Ventures, Inc., Lake Forest, CA (US)

( * ) Notice: Subject to any disclaimer, the term of this patent is extended or adjusted under 35 U.S.C. 154(b) by 737 days.

(21) Appl. No.: 09/863,194

(22) Filed: May 23, 2001

(51) Int. Cl.[7] .............................................. G06F 15/16
(52) U.S. Cl. ..................... 709/219; 709/203; 709/217; 709/218; 707/10; 711/113; 711/118
(58) Field of Search ................................ 709/219, 203, 709/217, 218; 707/10

(56) References Cited

U.S. PATENT DOCUMENTS

| | | | |
|---|---|---|---|
| 6,169,897 B1 * | 1/2001 | Kariya | 455/456.3 |
| 6,185,608 B1 * | 2/2001 | Hon et al. | 709/216 |
| 6,243,089 B1 * | 6/2001 | Gong | 345/744 |
| 6,253,234 B1 * | 6/2001 | Hunt et al. | 709/213 |
| 6,349,326 B1 * | 2/2002 | Lam | 709/203 |
| 6,366,947 B1 * | 4/2002 | Kavner | 709/203 |
| 6,404,446 B1 * | 6/2002 | Bates et al. | 345/854 |
| 6,650,889 B1 * | 11/2003 | Evans et al. | 455/418 |

OTHER PUBLICATIONS http://www.microsoft.com/windows/le/Features/History/default.asp.

* cited by examiner

*Primary Examiner*—Ario Etienne
*Assistant Examiner*—LaShonda Jacobs
(74) *Attorney, Agent, or Firm*—Milad G. Shara, Esq.; Howard H. Sheerin, Esq.

(57) ABSTRACT

A method of operating a mobile terminal comprising a local memory and a screen is disclosed. Web pages are received by the mobile terminal and stored in the local memory. A cache status of each web page identified by each link is determined, wherein the cache status is evaluated to control the display of the links of a web page on the screen of the mobile terminal.

36 Claims, 13 Drawing Sheets

MODIFYING WEB PAGE LINKS FOR DISPLAY ON A MOBILE TERMINAL TO INDICATE THE CACHE STATUS OF LINKED WEB PAGES

CROSS REFERENCE TO RELATED APPLICATIONS AND PATENTS

This application is related to co-pending U.S. patent application Ser. No. 09/863,572 entitled "REMOTELY SYNCHRONIZING A MOBILE TERMINAL BY ADAPTING ORDERING AND FILTERING SYNCHRONIZATION RULES BASED ON A USER'S OPERATION OF THE MOBILE TERMINAL", the disclosure of which is herein incorporated by reference.

BACKGROUND OF THE INVENTION

1. Field of the Invention

The present invention relates to mobile terminals. More particularly, the present invention relates to modifying web page links for display on a mobile terminal to indicate the cache status of linked web pages.

2. Description of the Prior Art

Figure 1:
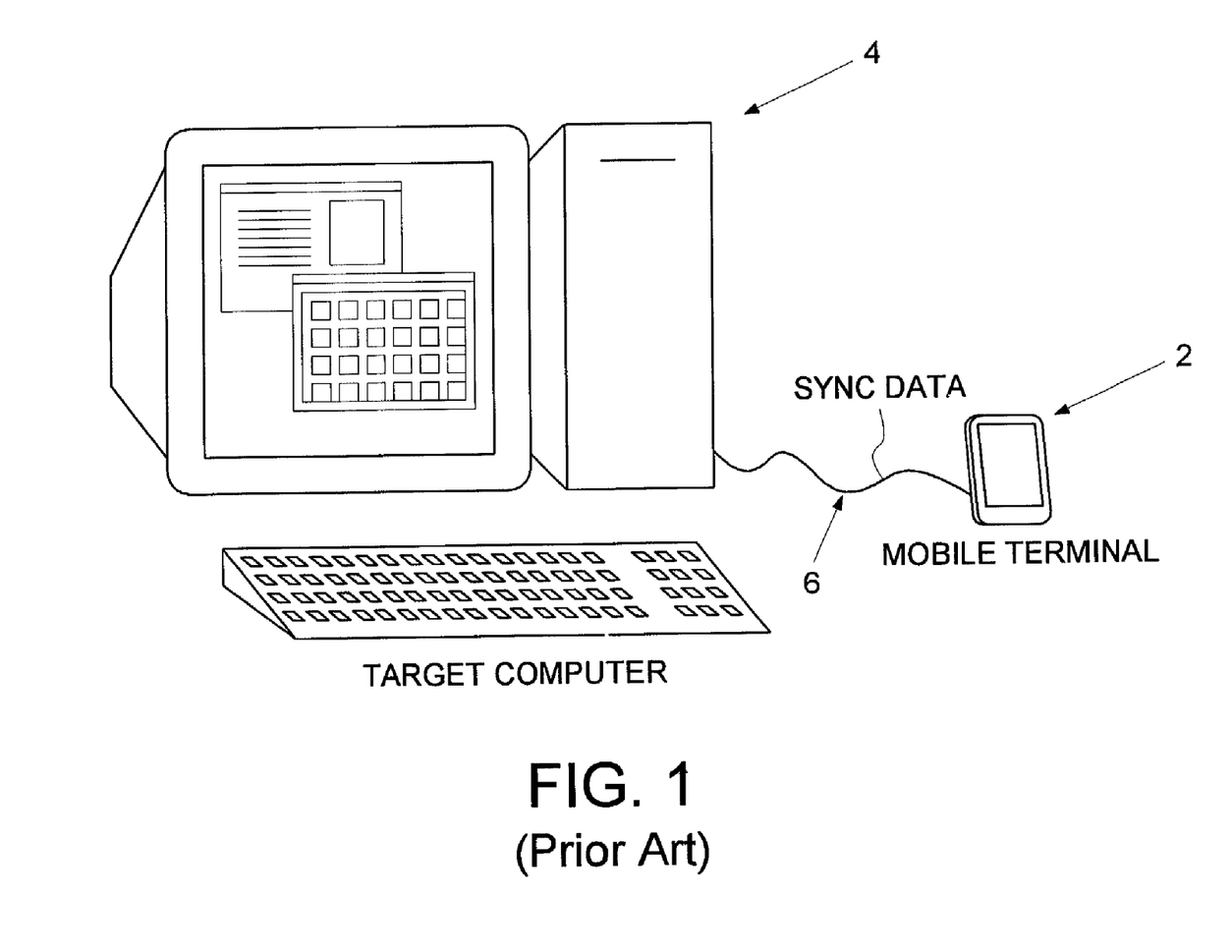
FIG. 1 shows a prior art configuration wherein a mobile terminal is synchronized to a target computer over a direct wired connection, including synchronizing to Internet web sites.

A mobile terminal, such as handheld computer, cellular phone, tablet computer, etc., may be used to browse web pages downloaded from the Internet off-line or on-line. Off-line browsing is typically performed after web pages from selected web sites have been transmitted to the mobile terminal during a synchronization session and cached in the local memory of the mobile terminal. FIG. 1 shows a prior art configuration for synchronizing a mobile terminal 2 to a target computer 4 over a direct, wired connection 6 (e.g., a USB connection). The target computer 4 is also typically connected to the Internet so that it may download web pages which are transmitted to the mobile terminal 2 during the synchronization session.

The user typically configures a "link-depth" which determines how deep within each web site links will be followed when synchronizing to the web site. The web pages are transmitted starting with a "root" web page and following through the links for the root web page in the order they are encountered until all of the links have been transmitted for the specified "link-depth", or until the memory allocated for the web site is exhausted. If a "dead" link is encountered during the synchronization session (meaning that the linked web page cannot be found), the "dead" link is still transmitted with the current web page. All of the links at the end of the "link-depth" are "dead" links since the corresponding linked web pages are not transmitted to the mobile terminal. Similarly, if the memory is exhausted during the synchronization session, the remaining links of the current web page as well as the remaining links on the root web page will be "dead" links. When the user is browsing the web pages off-line and clicks on a "dead" link, an error message is displayed indicating that the linked web page is not available. This degrades the perceived performance of the mobile terminal since the user cannot discern a "dead" link and therefore will waste time clicking on "dead" links.

Figure 2:
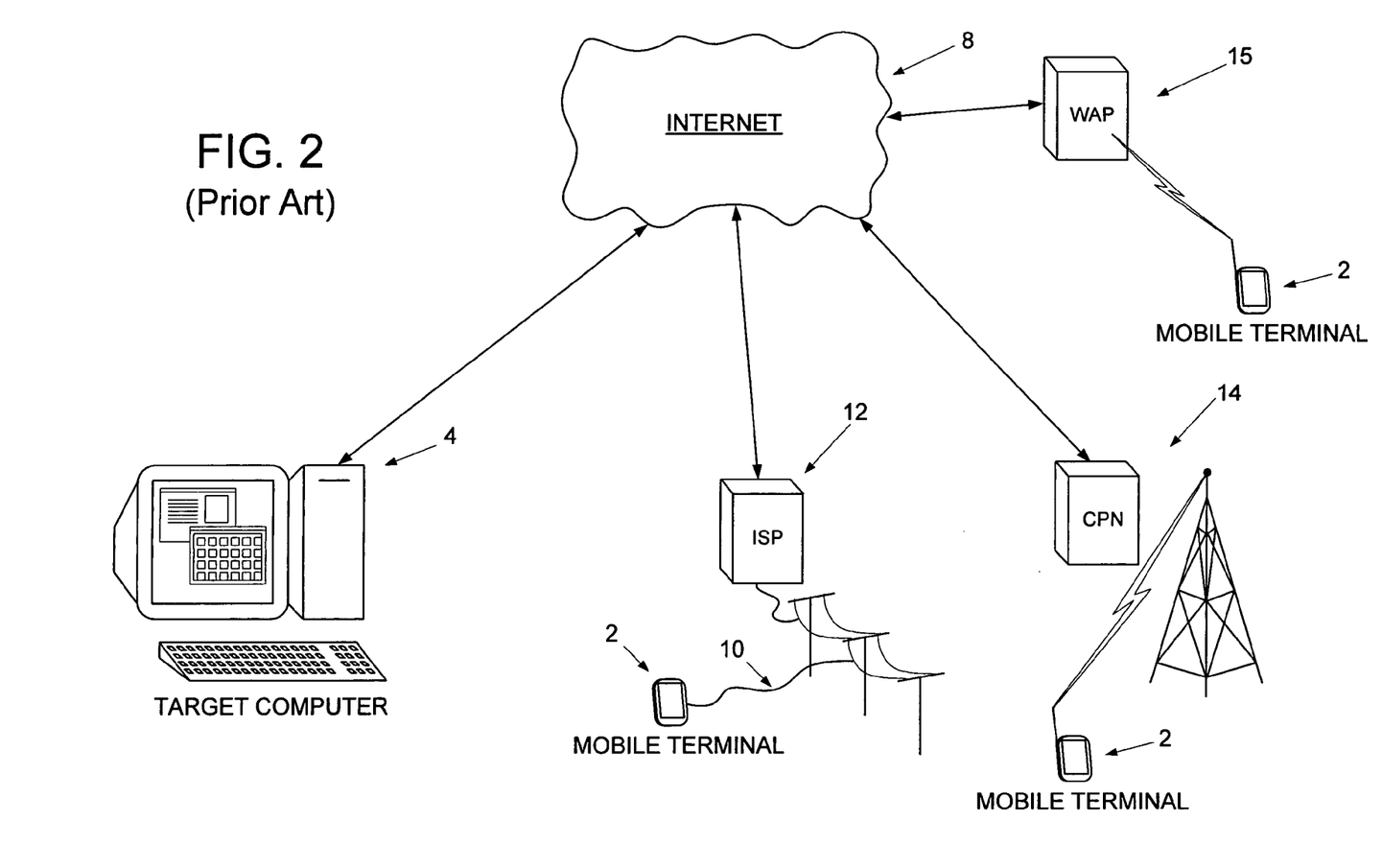
FIG. 2 shows a prior art configuration wherein a mobile terminal is synchronized remotely to the target computer or used to browse the Internet on-line over telephone land lines or over a wireless network.

A similar performance degradation occurs when the user is browsing the Internet on-line, for example, over a wireless connection. FIG. 2 shows prior art configurations for browsing the Internet 8 wherein in one configuration, the mobile terminal 2 accesses the Internet 8 over a wired connection 10 (e.g., telephone lines) and an Internet service provider (ISP) 12. In another configuration, the mobile terminal 2 accesses the Internet 8 over a wireless network such as a cellular provider network (CPN) 14 or a short range wireless access point (WAP) 15, such as Bluetooth, 802.11b, or HomeRF. In either case the bandwidth of the communication channel is typically limited which can degrade the data access performance of the mobile terminal.

During on-line browsing, web pages may be cached in the local memory of the mobile terminal either from having previously visited the web page during an on-line browsing session or from a synchronization session. If the user selects a link wherein the corresponding web page is cached in the local memory, the mobile terminal will retrieve the web page from the local memory rather than download the web page from the Internet. This enhances the performance of the mobile terminal since retrieving web pages from the local memory is typically much faster than downloading web pages from the Internet over a low bandwidth connection. However, conventional browsing programs do not distinguish between links having cached web pages and non-cached web pages. Thus, the user has no indication of how fast information will be displayed on the mobile terminal when clicking through a link.

Figure 3:
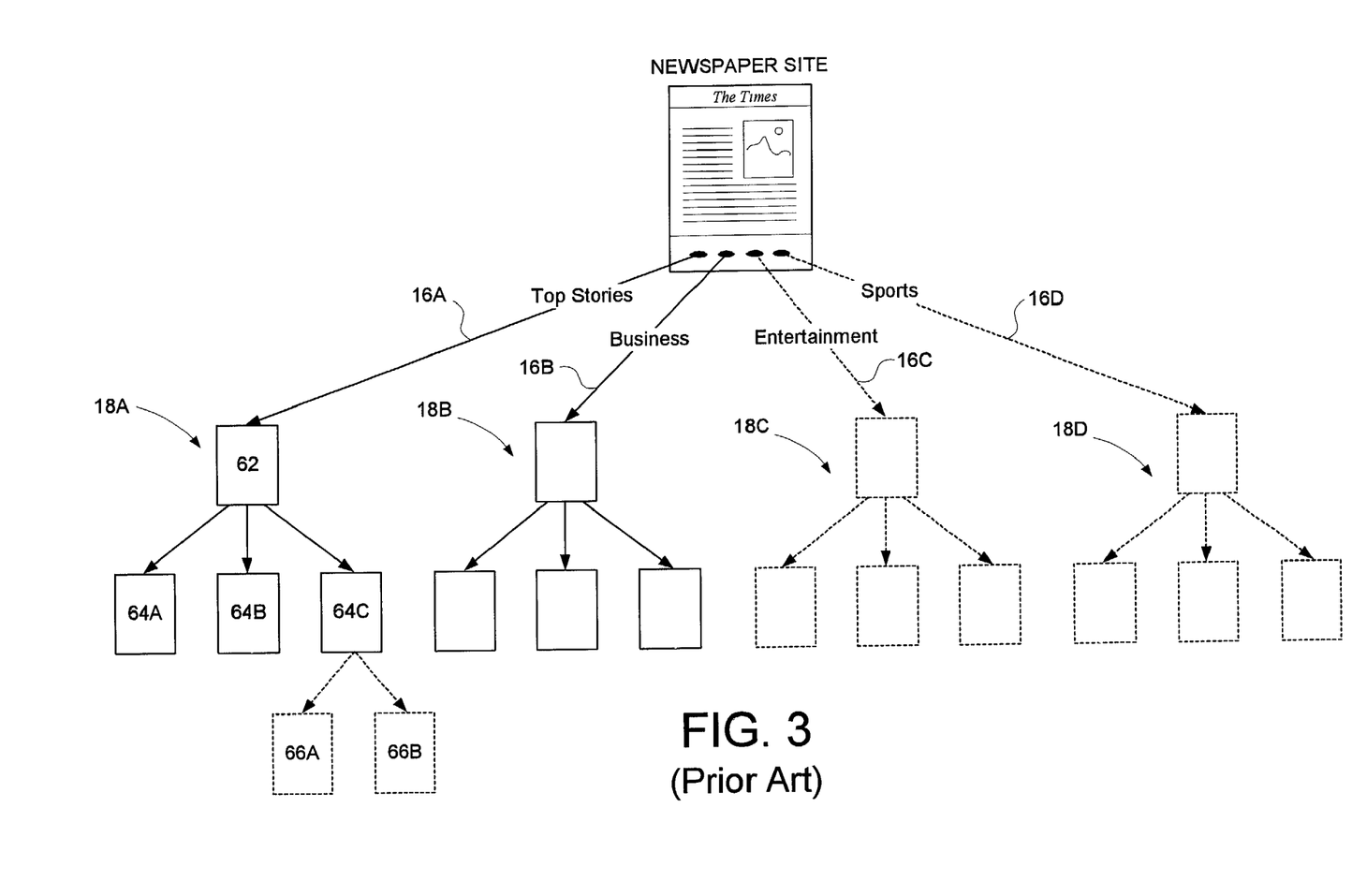
Figure 4:
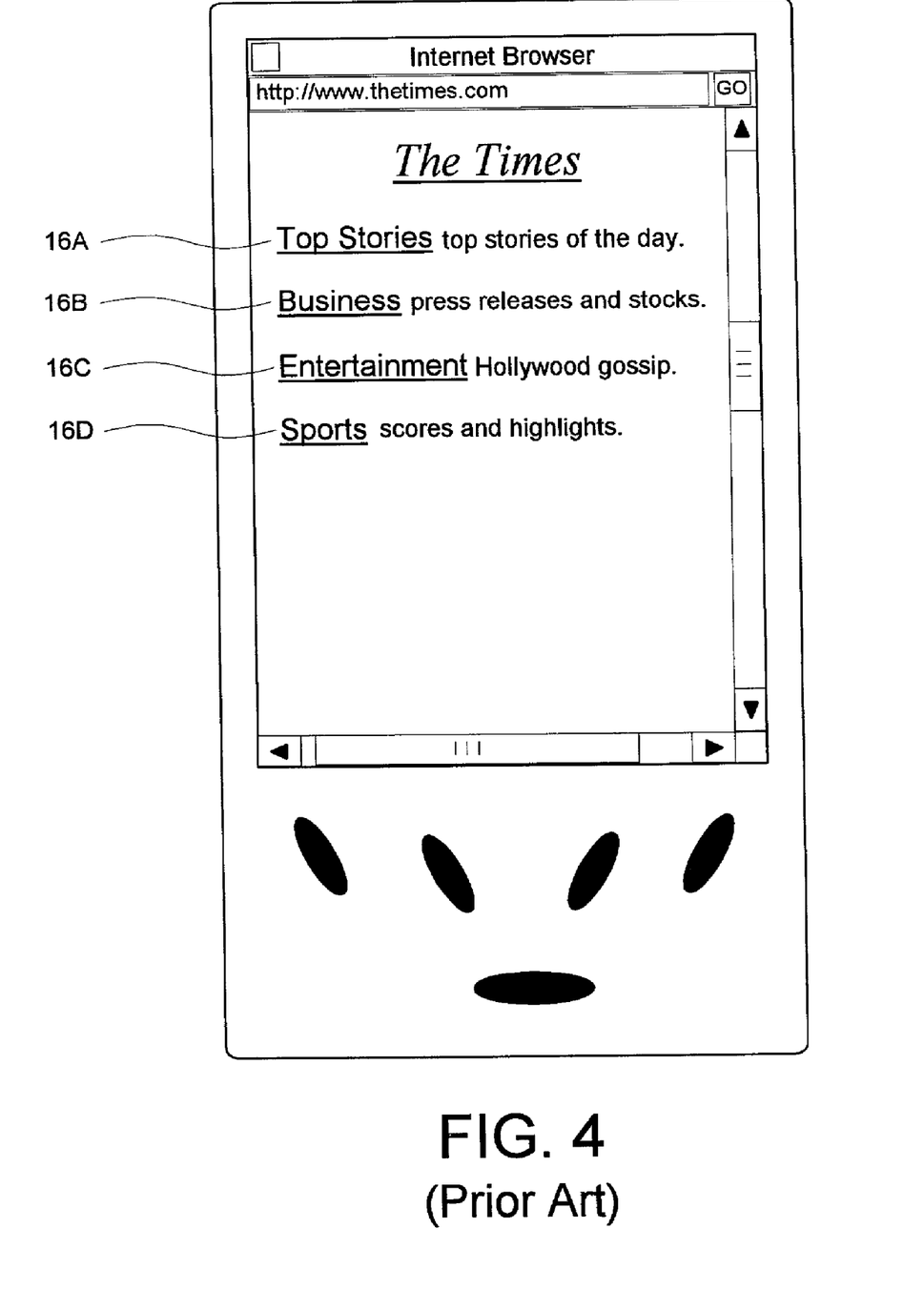
FIG. 4 shows a prior art mobile terminal indiscriminately displaying the links of the newspaper web site of FIG. 3 without indicating whether the corresponding linked web pages are cached in the mobile terminal.

FIG. 3 shows a newspaper web site comprising a "Top Stories" link 16A, a "Business" link 16B, an "Entertainment" link 16C, and a "Sports" link 16D. In this example, during a synchronization session the web pages 18A linked to the "Top Stories" link 16A and the web page 18B linked to the "Business" link 16B are downloaded to the mobile terminal before the memory allocated to this web site is exhausted. Thus, the web pages 18C linked to the "Entertainment" link 16C and the web pages 18D linked to the "Sports" link 16D are not downloaded to the mobile terminal. FIG. 4 shows that a prior art mobile terminal will display all of the links for the newspaper site, including the "Entertainment" link 16C and "Sports" link 16D, even though these are "dead" links since the linked web pages are not cached in the mobile terminal's memory. If the user clicks on either of these links during an off-line browsing session, an error message is displayed indicating that the selected web page is not available. A similar drawback manifests when browsing the Internet on-line. Referring again to FIG. 3, the web pages 18A and 18B may be cached in the mobile terminal due to a prior synchronization session or having previously browsed these web pages, whereas web pages 18C and 18D may not be cached in the mobile terminal. As illustrated in FIG. 4, the prior art mobile terminal will indiscriminately display the "Top Stories" link 16A, "Business" link 16B, "Entertainment" link 16C, and "Sports" link 16D without indicating whether the corresponding linked web pages are cached by the mobile terminal. Thus, the user cannot determine how fast web pages will be displayed, that is, whether a web page will be displayed quickly due to being cached or whether it will need to be downloaded from the Internet. The user must select each link to discover whether the corresponded linked web page has been cached. This is undesirable since a user may prefer to view only cached web pages in order to conserve battery power and increase browsing performance.

There is, therefore, a need to enhance the performance of a mobile terminal when performing on-line or off-line browsing of Internet web pages.

SUMMARY OF THE INVENTION

The present invention may be regarded as a method of operating a mobile terminal comprising a local memory and a screen. A plurality of web pages are received by the mobile terminal and stored in the local memory. At least one of the web pages comprises a plurality of links, wherein at least one of the links identifies a web page at least partially cached in the local memory. A cache status of each web page identified by each link is determined, wherein the cache status is evaluated to control the display of the links of a web page on the screen of the mobile terminal.

In one embodiment at least one of the links identifies a web page substantially cached in the local memory, and at least one of the links identifies a web page not substantially cached in the local memory. The first link is displayed to indicate the web page identified by the first link is substantially cached in the local memory, and the second link is displayed to indicate the web page identified by the second link is not substantially cached in the local memory.

In one embodiment, the step of processing the cache status comprises the step of omitting links in the displayed web page that identify web pages not substantially cached in the local memory. In an alternative embodiment, the step of processing the cache status comprises the step of displaying links in the displayed web page in a manner that identifies web pages not substantially cached in the local memory. In one embodiment, the link is displayed in a manner that indicates a connection is available to download the linked web page from the Internet.

In one embodiment, the web pages are received by the mobile terminal during a synchronization session, and the links of the web page are displayed during an off-line browsing session. In another embodiment, the links of the web page are displayed during an on-line browsing session.

In yet another embodiment, the cache status of each web page indicates an extent that subordinate web pages are cached in the local memory. In one embodiment, the extent that subordinate web pages are cached in the local memory is determined relative to a link-depth configured for a synchronization session.

The present invention may also be regarded as a mobile terminal comprising a local memory for storing a plurality of web pages received by the mobile terminal, wherein at least one of the web pages comprises a plurality of links and at least one of the links identifies a web page at least partially cached in the local memory. The mobile terminal further comprises a screen and a terminal controller. The terminal controller for determining a cache status of each web page identified by each link, and evaluating the cache status to control the display of the links of a web page on the screen of the mobile terminal.

The present invention may also be regarded as computer program embodied on a computer readable storage medium for use in a mobile terminal, wherein the mobile terminal comprises a local memory and a screen. The computer program comprises a code segment for receiving web pages and storing the web pages in the local memory, wherein at least one of the web pages comprises a plurality of links and at least one of the links identifies a web page at least partially cached in the local memory. The computer program further comprises code segments for determining a cache status of each web page identified by each link, and evaluating the cache status to control the display of the links of a web page on the screen of the mobile terminal.

BRIEF DESCRIPTION OF THE DRAWINGS

FIG. 3 shows how a prior art mobile terminal will cache the web pages of a web site until the memory allocated to the web site is exhausted, thereby leaving "dead" links displayed during an off-line browsing session. FIG. 3 also shows how a number of web pages may have been cached within the mobile terminal and are therefore retrieved from the local memory during a browsing session rather than downloaded from the Internet.

DESCRIPTION OF THE PREFERRED EMBODIMENTS

Figure 7A:
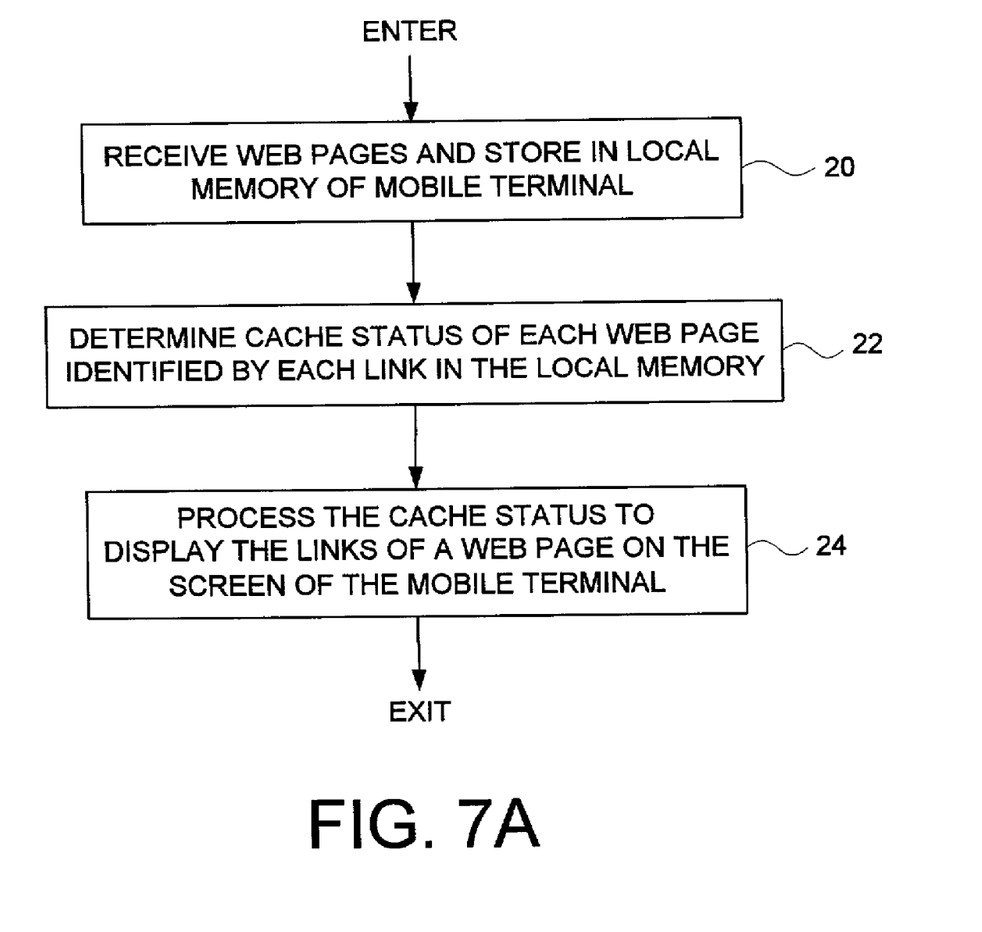
FIG. 7A shows a flow chart according to an embodiment of the present invention wherein a plurality of web pages are received by a mobile terminal, each web page comprises one or more links, the cache status of each linked web page is determined, and the cache status is used to display the links to indicate the cache status of each linked web page.

FIG. 7A shows a flow chart according to an embodiment of the present invention wherein a plurality of web pages are received by a mobile terminal, each web page comprises one or more links, the cache status of each linked web page is determined, and the cache status is used to display the links to indicate the cache status of each linked web page. At step 20 a plurality of web pages are received by the mobile terminal and stored in the local memory. At least one of the web pages comprises a plurality of links, wherein at least one of the links identifies a web page at least partially cached in the local memory. At step 22 a cache status of each web page identified by each link is determined, and at step 24 the cache status is used to control the display of the links of a web page on the screen of the mobile terminal.

In one embodiment at least one of the links identifies a web page substantially cached in the local memory (including fully cached), and at least one of the links identifies a web page not substantially cached in the local memory (including not cached at all). The links identifying web pages that are substantially cached are displayed as "active" links since the cached portion of the linked web pages comprise a sufficient amount of useful information, and if on-line browsing, won't take a significant amount of time to download the content not cached. Conversely, the links identifying web pages that are not substantially cached are considered "dead" links since the cached portion of the linked web pages do not contain a sufficient amount of useful information, and if on-line browsing, will take a significant amount of time to download the content not cached.

Figure 7B:
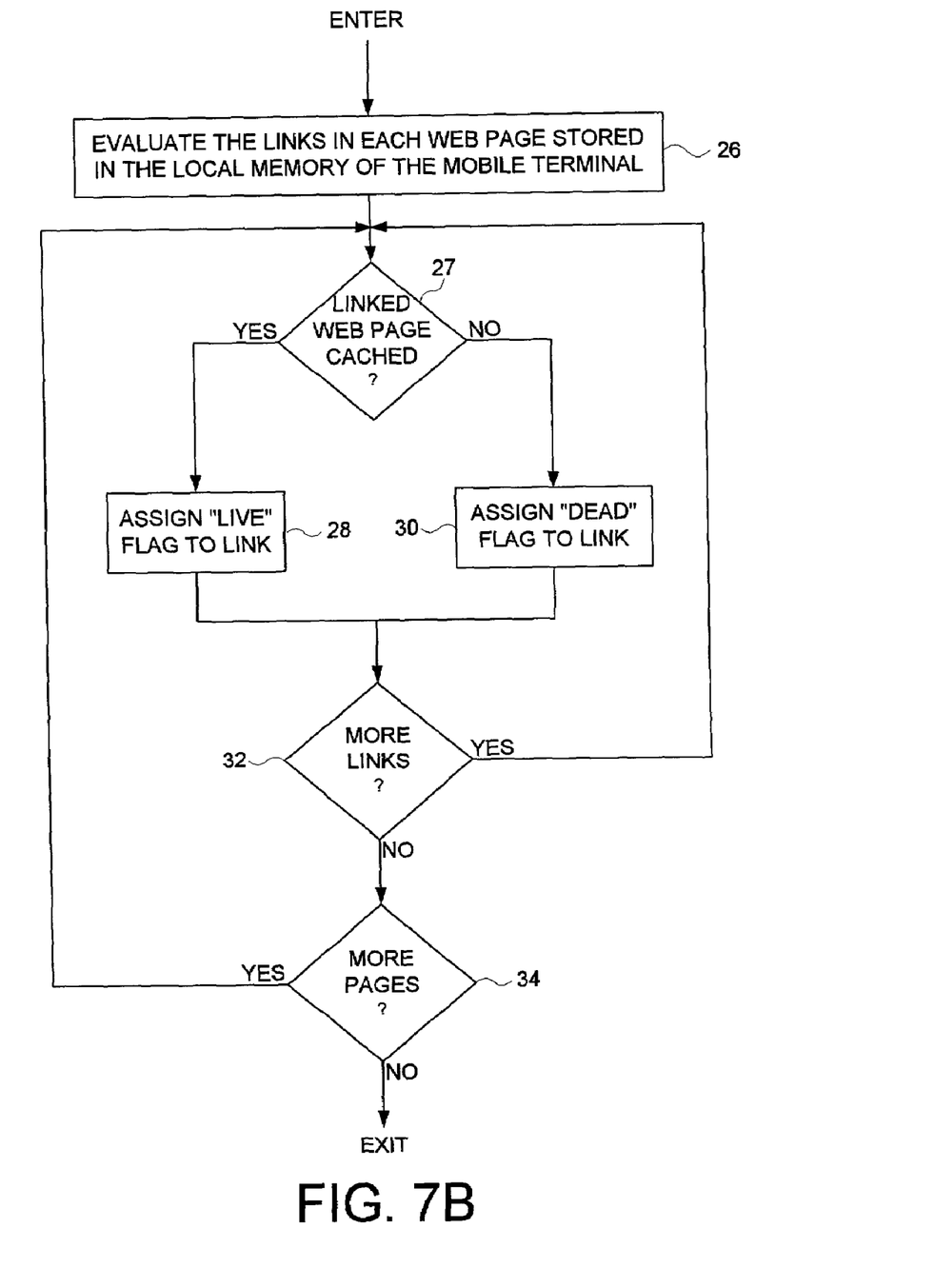
FIG. 7B shows a flow chart according to an embodiment of the present invention wherein a flag is assigned to each link to indicate whether the corresponding linked web page is cached.

FIG. 7B shows a flow chart according to an embodiment of the present invention wherein a flag is assigned to each link to indicate whether the corresponding linked web page is cached. After receiving a web page during a synchronization session, at step 26 each link is evaluated to determine the cache status of the linked web page. If the linked web page is cached at step 27, at step 28 a "live" flag is assigned to the link, otherwise at step 30 a "dead" flag is assigned to the link. At step 32 the process repeats until all of the links for the current web page have been processed, and at step 34 the process repeats until all of the web pages cached in the mobile terminal have been processed.

Figure 5A:
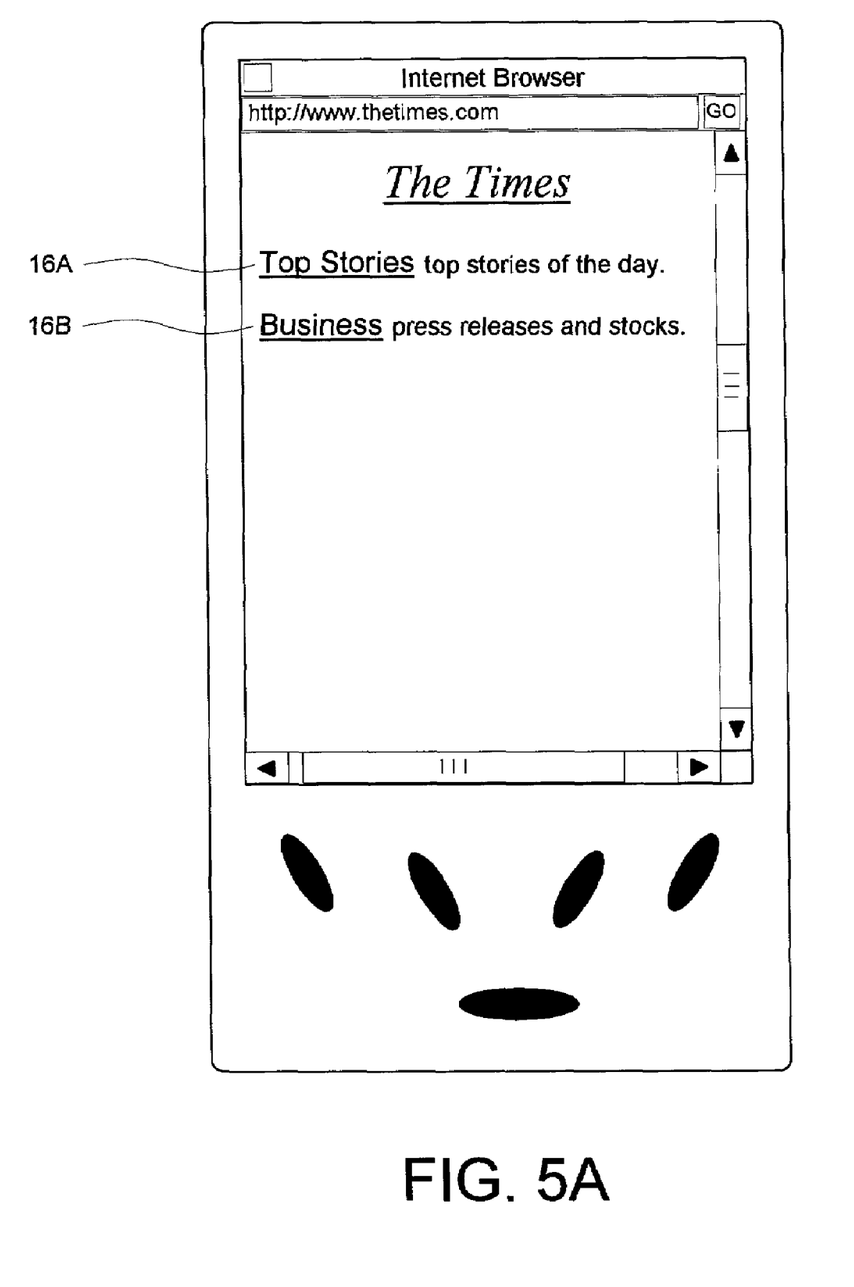
FIG. 5A shows a mobile terminal according to an embodiment of the present invention wherein the "dead" links associated with web pages not cached in the mobile terminal are not displayed during the browsing session.
Figure 5B:
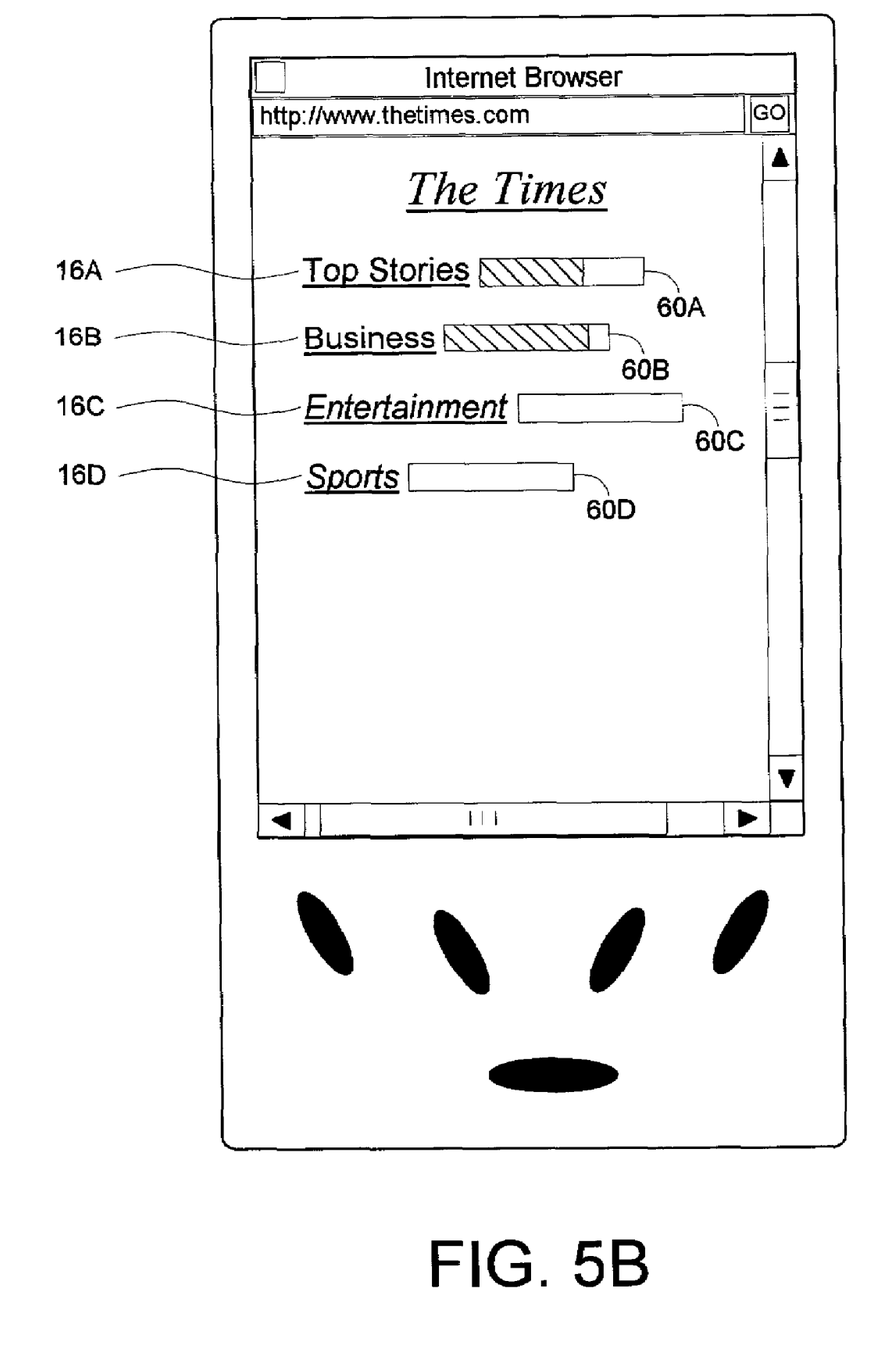
FIG. 5B shows a mobile terminal according to an alternative embodiment of the present invention wherein the "dead" links of a web page are displayed in italic to indicate the corresponding web pages are not cached in the mobile terminal, or alternatively with a bar graph to indicate the extent a web page is cached in the mobile terminal.
Figure 7C:
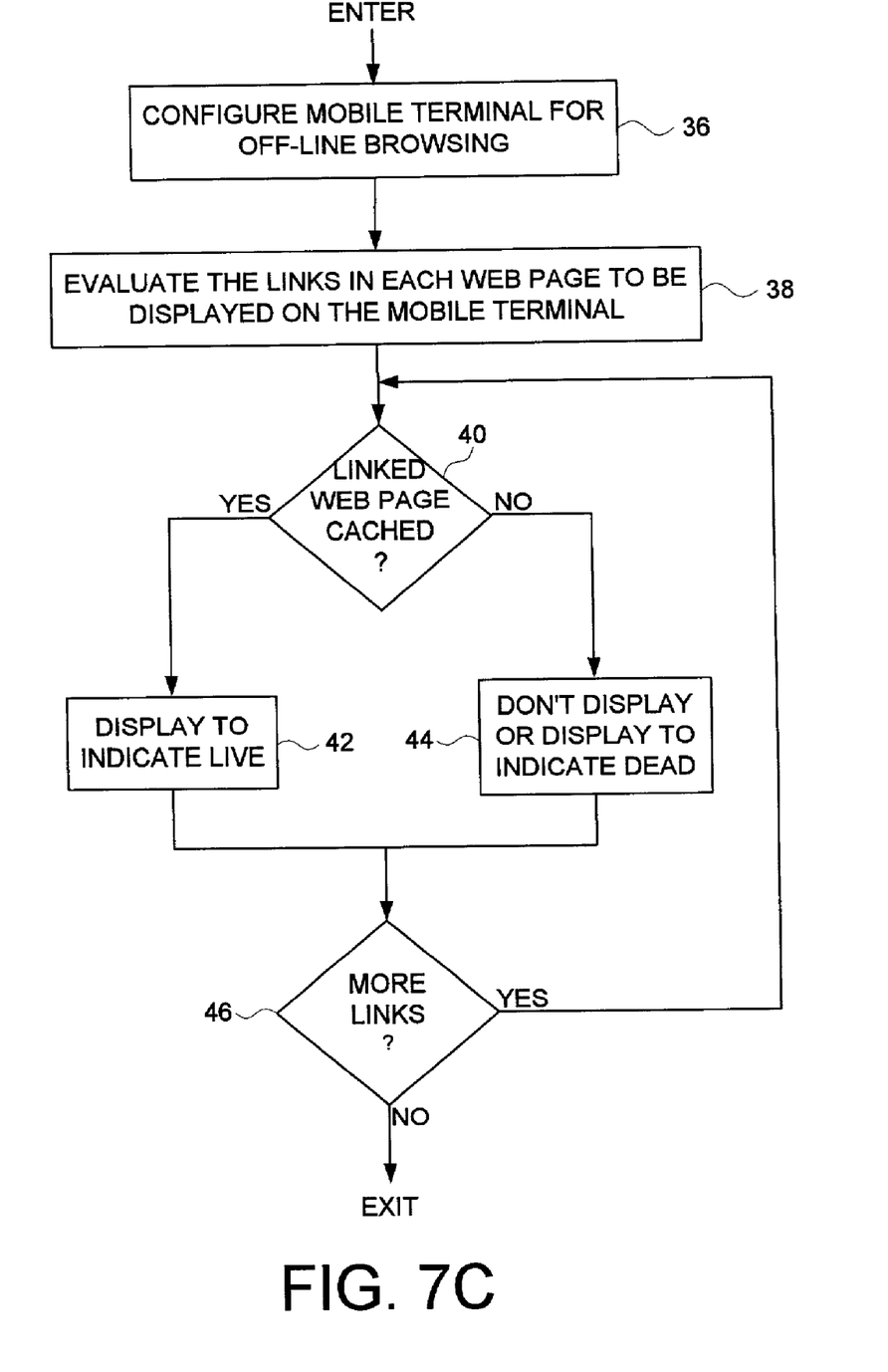
FIG. 7C shows a flow chart according to an embodiment of the present invention wherein during an off-line browsing session "dead" links are not displayed or displayed in a manner that indicates the corresponding linked web page is not cached in the mobile terminal.

FIG. 7C shows a flow chart according to an embodiment of the present invention wherein during an off-line browsing session "dead" links are not displayed or displayed in a manner that indicates the corresponding linked web page is not cached in the mobile terminal. At step 36 the mobile terminal is configured for an off-line browsing session. At step 38 the mobile terminal evaluates each link of each web page to be displayed. If at step 40 the linked web page is cached, at step 42 the link is displayed to indicate the link is "live", otherwise at step 44 the link is not displayed or displayed to indicate the link is "dead". At step 46 this process repeats until all of the links have been processed for the web page being displayed. FIG. 5A and FIG. 5B illustrate this aspect of the present invention for the newspaper web site of FIG. 3 wherein web pages 18A and 18B are cached in the mobile terminal, but not web pages 18C and 18D. In FIG. 5A the "Top Stories" link 16A and "Business" link 16B are displayed on the screen of the mobile terminal, but not the "Entertainment" link 16C and "Sports" link 16D.

Predetermined content (e.g., text) may be associated with a link but not part of the link. This is illustrated in FIG. 4 wherein the text "Hollywood gossip" describes the "Entertainment" link 16C but is not part of the link. In one embodiment of the present invention, the text associated with a "dead" link is also omitted when displaying a web page. FIG. 5A illustrates this embodiment wherein the text "Hollywood gossip" associated with the "Entertainment" link 16C is omitted from the displayed page, and the text "scores and highlights" associated with the "Sports" link 16 D is omitted from the displayed page. In one embodiment, the text associated with a link is identified using a predetermined identifier, such as a hypertext markup language (HTML) tag.

FIG. 5B illustrates an alternative embodiment wherein the "live" links (16A and 16B) are displayed in a normal font to indicate the linked web pages are cached in the mobile terminal, and the "dead" links (16C and 16D) are displayed in italic to indicate the linked web pages are not cached in the mobile terminal. In one embodiment, the italic style is assigned to a link by modifying the HTML code for displaying the link (e.g., at step 30 of FIG. 7B). The following is an example of HTML code for displaying a link in italic font:

<p><a href="linked_page.htm"><em>Click Here</em></a></p>

In this example, the "href" tag specifies the linked web page entitled "linked_page.htm" for the link "Click Here". The "<em>" and "</em>" tags are added to the HTML code (e.g., at step 30 of FIG. 7B) so that the link is displayed in italic.

Figure 7D:
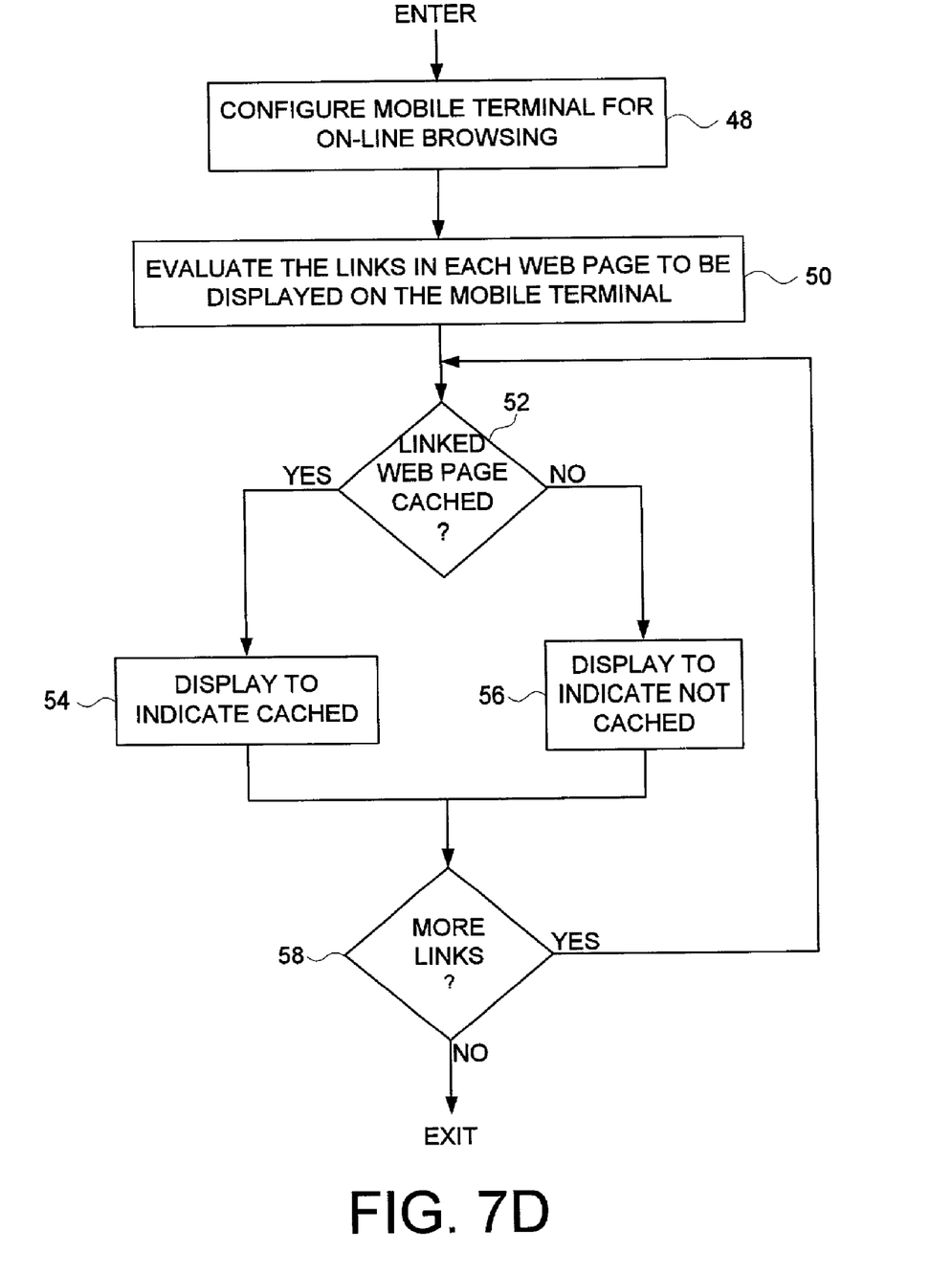
FIG. 7D shows a flow chart according to an embodiment of the present invention wherein during an on-line browsing session links are displayed to indicate whether the corresponding linked web pages are cached in the local memory of the mobile terminal.

FIG. 7D shows a flow chart according to an embodiment of the present invention wherein during an on-line browsing session links are displayed to indicate whether the corresponding linked web pages are cached in the local memory of the mobile terminal. At step 48 the mobile terminal is configured for an on-line browsing session. At step 50 the mobile terminal evaluates each link of each web page to be displayed. If at step 52 the linked web page is cached, at step 54 the link is displayed to indicate the linked web page is cached, otherwise at step 56 the link is displayed to indicate the linked web page is not cached. At step 58 this process repeats until all of the links have been processed for the web page being displayed. FIG. 5B illustrates this aspect of the present invention for the newspaper web site of FIG. 3 wherein web pages 18A and 18B are cached in the mobile terminal, but not web pages 18C and 18D. In FIG. 5B the "live" links (16A and 16B) are displayed in a normal font to indicate the linked web pages are cached in the mobile terminal, and the "dead" links (16C and 16D) are displayed in italic to indicate the linked web pages are not cached in the mobile terminal. In one embodiment, the "dead" links are displayed in a manner that indicates a connection is available to download the web pages from the Internet. In FIG. 5B, for example, the "dead" links (16C and 16D) may be displayed in italic bold to indicate that the linked web page is not cached, but that there is a connection to the Internet (e.g., a wireless connection) for downloading the web page.

Any suitable method for displaying a link to indicate the cache status of the linked web page may be employed. FIG. 5B illustrates an alternative embodiment for displaying a link wherein a bar graph (60A–60D) indicates the percentage of the linked web page that is cached. In one embodiment, the bar graph indicates the amount of time (e.g., seconds) that would be required to download the remainder of the linked web page given the current connection to the Internet. This allows the user to determine the level of performance when browsing web pages only partially cached. In yet another embodiment, a "rollover" indication is given wherein when the cursor is placed over a link, an indication is displayed (e.g., the cursor changes, the link changes, or the bar graph is displayed).

In one embodiment, the cache status of a link indicates the cache status of all the linked web pages subordinate to the link. This embodiment is particularly useful for indicating the cache status of a web site after synchronizing to the web site. In one embodiment, the number of web pages subordinate to a link is determined by traversing the web pages linked to the web page identified by the link. In one embodiment, a "link-depth" is specified by the user which determines how many links deep the synchronization process will follow starting with a root web page. Referring again to FIG. 3, if a link-depth of two is specified, the synchronization process will download web page 62 and web pages 64A–64C, but not web pages 66A and 66B. If the synchronization session successfully downloads all of the linked web pages through the link-depth, then the link is displayed to indicate that all of the subordinate web pages have been cached. For example, if the link-depth is two and the synchronization session successfully downloads web pages 62 and 64A–64C of FIG. 3, then the "Top Stories" link 16A is displayed to indicate that all of the subordinate web pages have been cached. If the memory allocated for the web site is exhausted or the synchronization session terminates before downloading all of the subordinate web pages, then the "Top Stories" link 16A is displayed to indicate that some or all of the subordinate web pages were not cached (e.g., using a bar graph).

In one embodiment, a path through a web site is established for the synchronization session to follow rather than attempting to synchronize to the entire web site. Referring again to FIG. 3, if the user prefers to only read the "Top Stories" and the "Business" articles, then the synchronization session is configured to follow links 16A and 16B but not links 16C and 16D. This embodiment improves performance by synchronizing only the data of interest to the user. Further details for establishing a synchronization path through a web site based on the user's preference are disclosed in the above referenced patent application entitled "REMOTELY SYNCHRONIZING A MOBILE TERMINAL BY ADAPTING ORDERING AND FILTERING SYNCHRONIZATION RULES BASED ON A USER'S OPERATION OF THE MOBILE TERMINAL".

Figure 6:
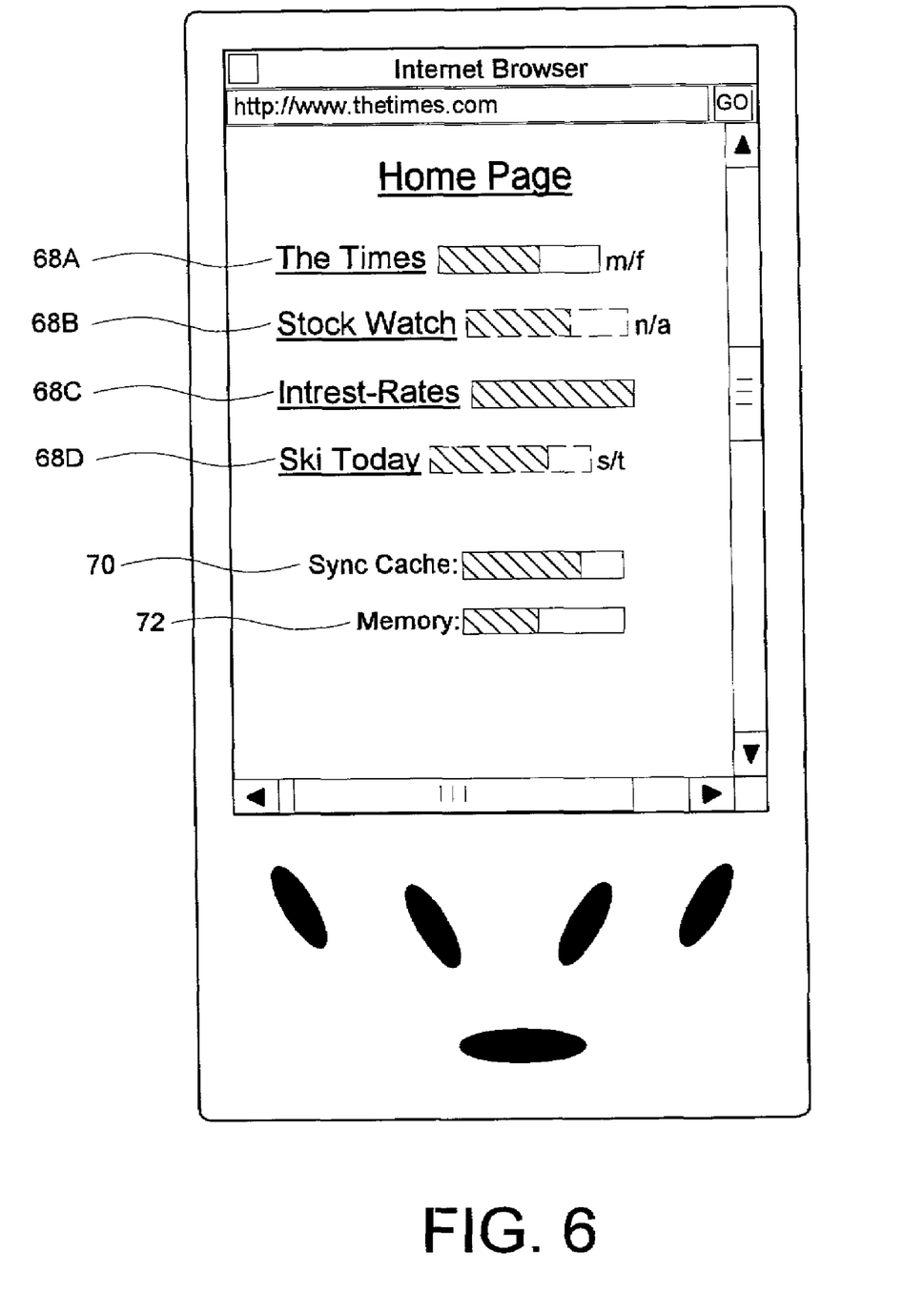
FIG. 6 shows a mobile terminal according to an embodiment of the present invention wherein after a synchronization session a home page is created showing the cache status of each synchronized web site, the overall cache status of the synchronized web sites, and the amount of unused memory available in the mobile terminal.

FIG. 6 shows a mobile terminal according to an embodiment of the present invention wherein after a synchronization session a home page is created showing the cache status of each synchronized web site, the overall cache status of the synchronized web sites, and the amount of unused memory available in the mobile terminal. In this example, "The Times" web site 68A was cached 65% before the memory allocated for that web site was exhausted as indicated by the "m/f" attribute. The "Stock Watch" web site 68B was not found as indicated by the dashed-line bar graph and "n/a" attribute. The "Interest-Rates" web site was fully cached, and the "Ski Today" web site was not synchronized due to the synchronization session terminating prematurely as indicated by the "s/t" attribute. The "Sync Cache" bar graph 70 indicates the percentage that all of the web sites were successfully cached during the synchronization session. In one embodiment, the overall sync cache status is determined relative to the size of each synchronized web site. The "Memory" bar graph 72 indicates the amount of unused memory available in the mobile terminal.

Figure 8A:
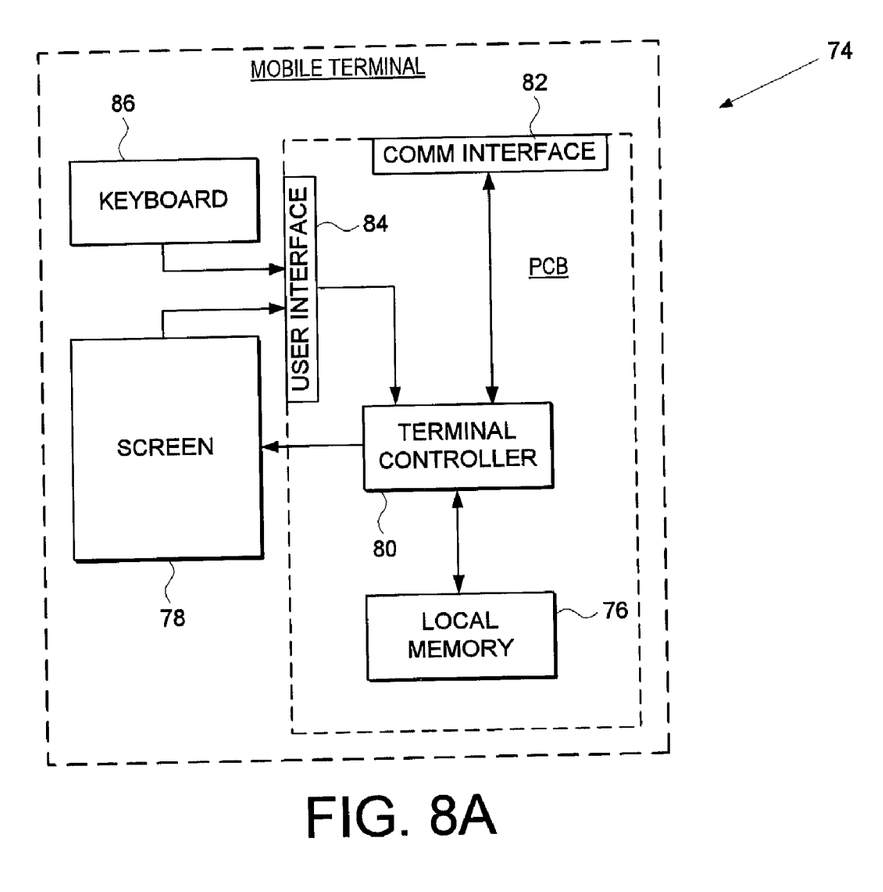
FIG. 8A shows a mobile terminal according to an embodiment of the present invention comprising a terminal controller for evaluating the links to determine the cache status of linked web pages, and for using the cache status for displaying the links of a web page on the screen of the mobile terminal.

FIG. 8A shows a mobile terminal 74 for communicating with a target computer according to an embodiment of the present invention. The mobile terminal 74 comprises a local memory 76 for storing a plurality of web pages received by the mobile terminal 74, wherein at least one of the web pages comprises a plurality of links and at least one of the links identifies a web page at least partially cached in the local memory. The mobile terminal 74 further comprises a screen 78 and a terminal controller 80. The terminal controller 80 is for determining a cache status of each web page identified by each link, and processing the cache status to display the links of a web page on the screen 78 of the mobile terminal 74. In the embodiment of FIG. 8A, the mobile terminal 74 further comprises a communication interface 82 for receiving the web pages, and a user interface 84 for receiving user input from a keyboard 86 as well as the screen 78.

Figure 8B:
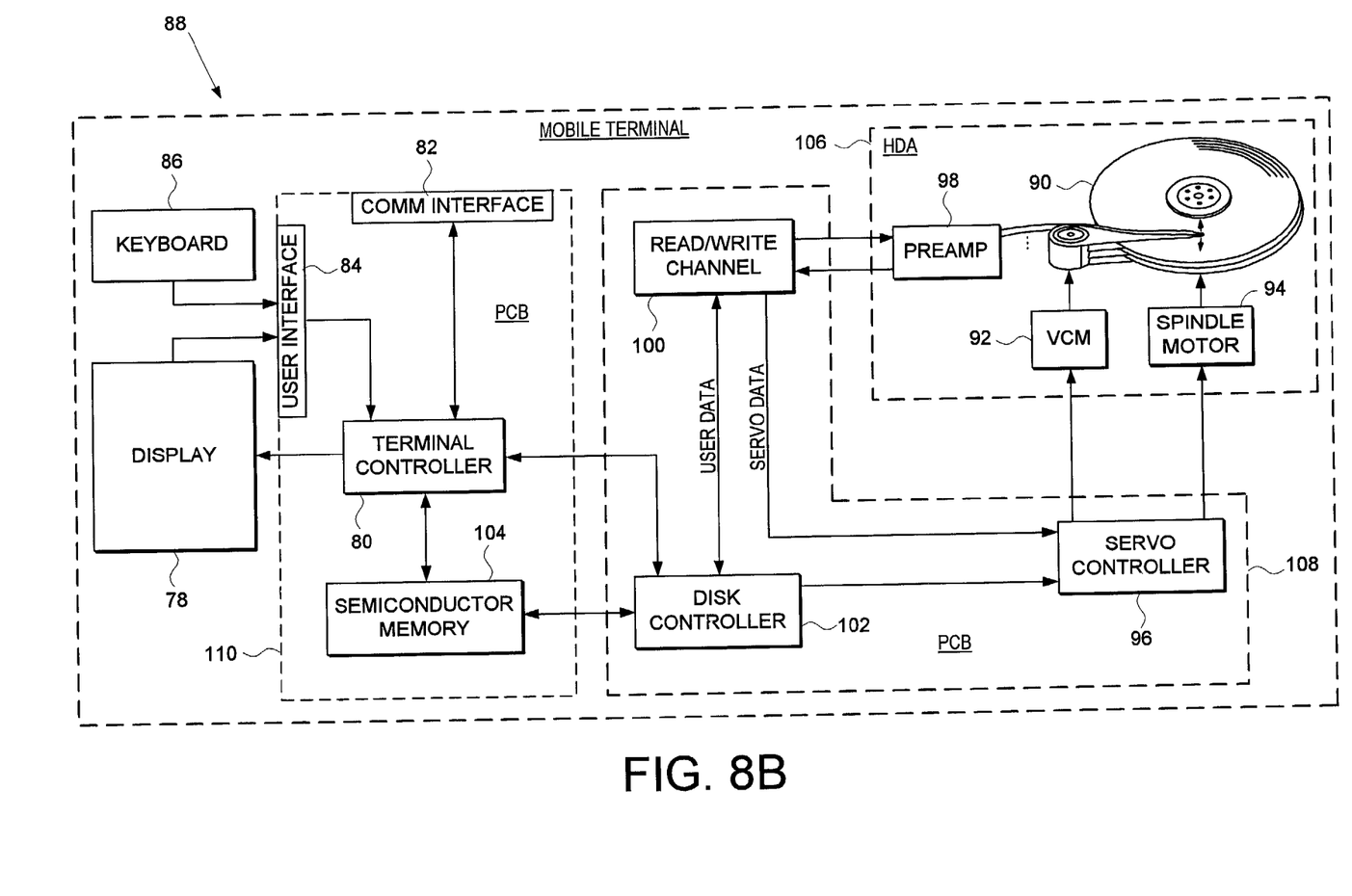
FIG. 8B shows a mobile terminal according to an embodiment of the present invention comprising a disk for non-volatile storage.

FIG. 8B shows a mobile terminal 88 according to an embodiment of the present invention wherein the local memory comprises a disk 90. The mobile terminal 88 further comprises components for enabling the disk storage, including a voice coil motor (VCM) 92 and spindle motor 94, a servo controller 96, a preamp 98, a read/write channel 100, and a disk controller 102. In the embodiment of FIG. 8B, the mobile terminal 88 comprises semiconductor memory 104 that is shared by the terminal controller 80 and disk controller 102 to reduce the cost of the mobile terminal 88. In another embodiment, the terminal controller 80 executes a disk caching algorithm for caching data read from and written to the disk 90. In the embodiment of FIG. 8B, the disk 90, VCM 92, spindle motor 94 and preamp 98 are implemented within a head disk assembly (HDA) 106, the servo controller 96, read/write channel 100 and disk controller 102 are implemented on a first printed circuit board (PCB) 108, and the terminal controller 80 and semiconductor memory 104 are implemented on a second PCB 110. In an alternative embodiment, the servo controller 96, read/write channel 100, disk controller 102, terminal controller 80, and semiconductor memory 104 are implemented on a single PCB.

In one embodiment, the local memory of the mobile terminal (e.g., the disk 90 in FIG. 8B) stores a computer program comprising code segments for receiving web pages and storing the web pages in the local memory, wherein at least one of the web pages comprises a plurality of links and at least one of the links identifies a web page at least partially cached in the local memory. The computer program further comprises code segments for determining a cache status of each web page identified by each link, and processing the cache status to display the links of a web page on the screen of the mobile terminal.

We claim:

1. A method of operating a mobile terminal comprising a local memory and a screen, the method comprising the steps of:
   (a) receiving a plurality of web pages and storing the web pages in the local memory, wherein at least one of the web pages comprises a plurality of links and at least one of the links identifies a web page at least partially cached in the local memory;
   (b) determining a cache status of each web page identified by each link; and
   (c) evaluating the cache status to control the display of the links of a web page on the screen of the mobile terminal.

2. The method as recited in claim 1, wherein:
   (a) a first one of the links identifies a web page substantially cached in the local memory;
   (b) a second one of the links identifies a web page not substantially cached in the local memory;
   (c) the first link is displayed to indicate the web page identified by the first link is substantially cached in the local memory; and (d) the second link is displayed to indicate the web page identified by the second link is not substantially cached in the local memory.

3. The method as recited in claim 1, wherein the step of evaluating the cache status comprises the step of omitting links in the displayed web page that identify web pages not substantially cached in the local memory.

4. The method as recited in claim 1, wherein the step of evaluating the cache status comprises the step of displaying the links in a manner that identifies web pages not substantially cached in the local memory.

5. The method as recited in claim 1, wherein the step of evaluating the cache status comprises the step of displaying the links in a manner that identifies web pages not substantially cached in the local memory and an availability of a connection to download the web pages from the Internet.

6. The method as recited in claim 1, wherein:
(a) the step of receiving the plurality of web pages occurs during a synchronization session with a target computer; and
(b) the step of controlling the display of the links of a web page on the screen of the mobile terminal occurs during an off-line browsing session.

7. The method as recited in claim 1, wherein the step of controlling the display of the links of a web page on the screen of the mobile terminal occurs during an on-line browsing session.

8. The method as recited in claim 1, wherein the cache status of each web page indicates an extent that subordinate web pages are cached in the local memory.

9. The method as recited in claim 8, wherein the number of subordinate web pages is determined by traversing the web pages linked to the web page identified by a link.

10. The method as recited in claim 8, wherein the extent that subordinate web pages are cached in the local memory is determined relative to a link-depth configured for a synchronization session.

11. The method as recited in claim 1, wherein:
(a) web page content is associated with at least one of the links; and
(b) the step of controlling the display of the links of a web page on the screen of the mobile terminal further includes the step of controlling the display of the associated web page content.

12. The method as recited in claim 11, wherein the step of controlling the display of the associated web page content comprises the step of omitting the associated web page content.

13. A mobile terminal comprising:
(a) a local memory for storing a plurality of web pages received by the mobile terminal, wherein at least one of the web pages comprises a plurality of links and at least one of the links identifies a web page at least partially cached in the local memory;
(b) a screen; and
(c) a terminal controller for:
determining a cache status of each web page identified by each link; and
evaluating the cache status to control the display of the links of a web page on the screen of the mobile terminal.

14. The mobile terminal as recited in claim 13, wherein:
(a) a first one of the links identifies a web page substantially cached in the local memory;
(b) a second one of the links identifies a web page not substantially cached in the local memory;
(c) the terminal controller displays the first link to indicate the web page identified by the first link is substantially cached in the local memory; and
(d) the terminal controller displays the second link to indicate the web page identified by the second link is not substantially cached in the local memory.

15. The mobile terminal as recited in claim 13, wherein the terminal controller omits links in the displayed web page that identify web pages not substantially cached in the local memory.

16. The mobile terminal as recited in claim 13, wherein the terminal controller displays the links in a manner that identifies web pages not substantially cached in the local memory.

17. The mobile terminal as recited in claim 13, wherein the terminal controller displays the links in a manner that identifies web pages not substantially cached in the local memory and an availability of a connection to download the web pages from the Internet.

18. The mobile terminal as recited in claim 13, wherein:
(a) the plurality of web pages are received by the mobile terminal during a synchronization session with a target computer, and
(b) the terminal controller controls the display of the links of a web page on the screen of the mobile terminal during an off-line browsing session.

19. The mobile terminal as recited in claim 13, wherein the terminal controller controls the display of the links of a web page on the screen of the mobile terminal during an on-line browsing session.

20. The mobile terminal as recited in claim 13, wherein the cache status of each web page indicates an extent that subordinate web pages are cached in the local memory.

21. The mobile terminal as recited in claim 20, wherein the number of subordinate web pages is determined by traversing the web pages linked to the web page identified by a link.

22. The mobile terminal as recited in claim 20, wherein the extent that subordinate web pages are cached in the local memory is determined relative to a link-depth configured for a synchronization session.

23. The mobile terminal as recited in claim 13, wherein:
(a) web page content is associated with at least one of the links; and
(b) the terminal controller controls the display of the links of a web page on the screen of the mobile terminal by controlling the display of the associated web page content.

24. The mobile terminal as recited in claim 23, wherein the terminal controller omits the associated web page content.

25. A computer program embodied on a computer readable storage medium for use in a mobile terminal, the mobile terminal comprising a local memory and a screen, the computer program comprising code segments for:
(a) receiving web pages and storing the web pages in the local memory, wherein at least one of the web pages comprises a plurality of links and at least one of the links identifies a web page at least partially cached in the local memory;
(b) determining a cache status of each web page identified by each link; and
(c) evaluating the cache status to control the display of the links of a web page on the screen of the mobile terminal.

26. The computer program as recited in claim 25, wherein:

(a) a first one of the links identifies a web page substantially cached in the local memory;
(b) a second one of the links identifies a web page not substantially cached in the local memory;
(c) the first link is displayed to indicate the web page identified by the first link is substantially cached in the local memory; and
(d) the second link is displayed to indicate the web page identified by the second link is not substantially cached in the local memory.

27. The computer program as recited in claim 25, wherein the code segment for evaluating the cache status omits links in the displayed web page that identifies web pages not substantially cached in the local memory.

28. The computer program as recited in claim 25, wherein the code segment for evaluating the cache status displays the links in a manner that identifies web pages not substantially cached in the local memory.

29. The computer program as recited in claim 25, wherein the code segment for evaluating the cache status displays the links in a manner that identifies web pages not substantially cached in the local memory and an availability of a connection to download the web pages from the Internet.

30. The computer program as recited in claim 25, wherein:
(a) the plurality of web pages are received during a synchronization session with a target computer; and
(b) controlling the display of the links of a web page on the screen of the mobile terminal occurs during an off-line browsing session.

31. The computer program as recited in claim 25, wherein controlling the display of the links of a web page on the screen of the mobile terminal occurs during an on-line browsing session.

32. The computer program as recited in claim 25, wherein the cache status of each web page indicates an extent that subordinate web pages are cached in the local memory.

33. The computer program as recited in claim 32, wherein the number of subordinate web pages is determined by traversing the web pages linked to the web page identified by a link.

34. The computer program as recited in claim 32, wherein the extent that subordinate web pages are cached in the local memory is determined relative to a link-depth configured for a synchronization session.

35. The computer program as recited in claim 25, wherein:
(a) web page content is associated with at least one of the links; and
(b) the code segment for controlling the display of the links of a web page on the screen of the mobile terminal further includes a code segment for controlling the display of the associated web page content.

36. The computer program as recited in claim 35, wherein the code segment for controlling the display of the associated web page content omits the associated web page content.

* * * * *